Oct. 29, 1940.  G. MARANGELO  2,219,997

PIPE TAPPER

Filed July 20, 1938   2 Sheets-Sheet 1

Inventor

George Marangelo

By Clarence A. O'Brien
and Hyman Berman
Attorneys

Oct. 29, 1940.   G. MARANGELO   2,219,997
PIPE TAPPER
Filed July 20, 1938   2 Sheets-Sheet 2

Inventor
George Marangelo
By Clarence A. O'Brien
and Hyman Berman
Attorneys

Patented Oct. 29, 1940

2,219,997

UNITED STATES PATENT OFFICE 2,219,997

PIPE TAPPER

George Marangelo, New York, N. Y.

Application July 20, 1938, Serial No. 220,362

3 Claims. (Cl. 77—38)

This invention appertains to new and useful improvements in pipe tapping apparatus.

The principal object of the present invention is to provide a pipe tapper whereby pipes can be tapped in a more efficient manner and which can drill taps at the desired angle with precision.

Another important object of the invention is to provide a pipe tapper which will take care of tapping pipes while under pressure in an efficient and practical manner.

These and various other important objects and advantages of the invention will become apparent to the reader of the following specification.

Figure 1:
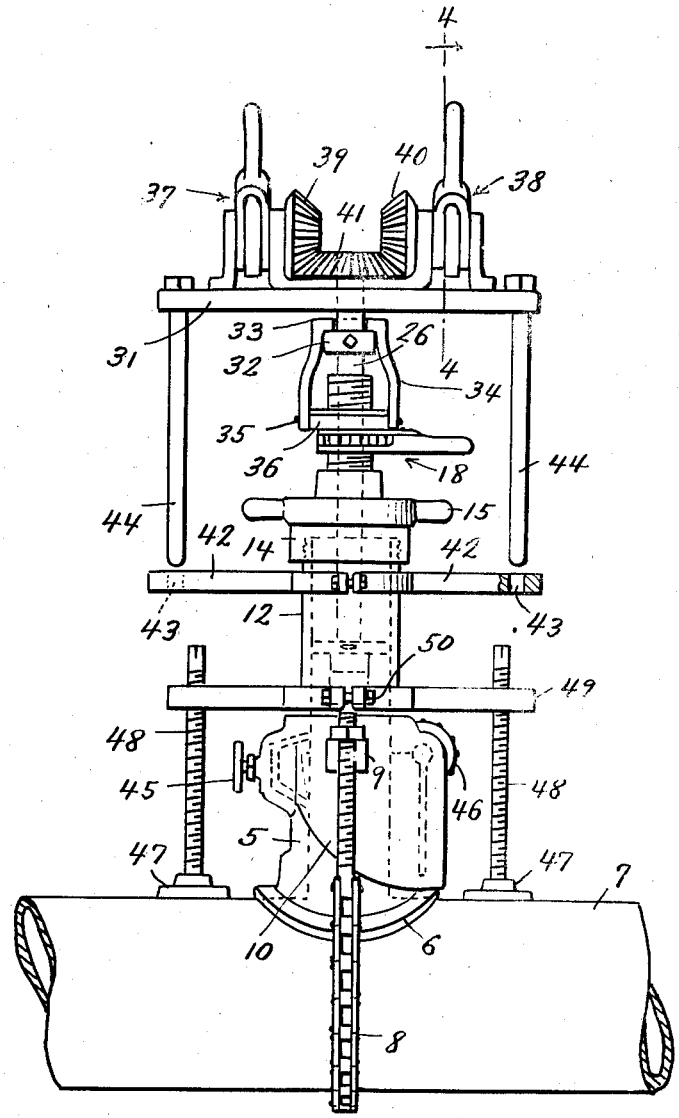
Figure 1 represents a side elevational view of the apparatus attached to a pipe.
Figure 2:
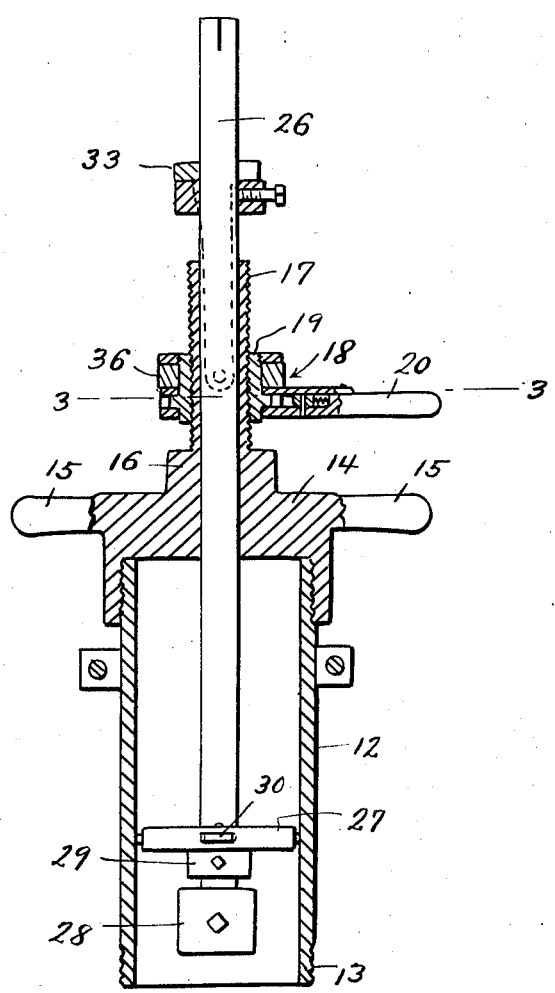
Figure 2 is a vertical sectional view through a portion of the apparatus.
Figure 3:
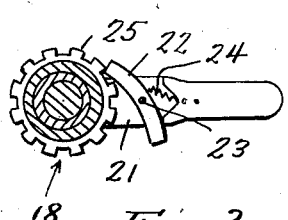
Figure 3 is a section on the line 3—3 of Figure 2.
Figure 4:
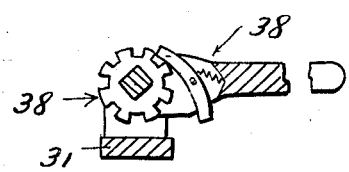
Figure 4 is a section on the line 4—4 of Figure 1.
Figure 5:
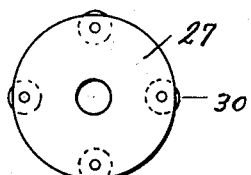
Figure 5 is a plan view of the centralizer.

Referring to the drawings wherein like numerals designate like parts, it can be seen that numeral 5 represents the body, which is flanged at its lower end as at 6 and otherwise shaped to rest upon a pipe 7 to be tapped.

Numeral 8 denotes the link chain which can be brought around from an anchored point at one side of the body, under the pipe 7 and engaged with the lugs 9 to secure the body snugly on the pipe. The lug engaging end of the chain 8 is provided with the threaded rod extension 10 pivotally connected to the chain and this rod is disposable through the lugs 9 and has the nut 11 detachably threaded against the lugs to tighten the chain around the pipe.

Numeral 12 denotes a cylinder the lower end portion of which is threaded as at 13 for threaded engagement into the upper portion of the body 5.

The upper portion of the cylinder 12 is threaded to accommodate the cap 14 which is provided with laterally disposed handle members 15.

The cap 14 has the upwardly disposed shoulder portion 16 from which rises the threaded tube 17 and on this is the right and left ratchet feed device generally referred to by numeral 18, the same consisting of the internally threaded sleeve 19, the handle 20, said handle being provided with a reduced portion 21 in which the two way pawl 22 is rockably mounted as at 23 and held in one position on the other by the spring 24. Numeral 25 represents the annulus of ratchet teeth with which the pawl 22 is engageable for the purpose of feeding the sleeve 19 upwardly or downwardly on the tube 17. The boring bar is denoted by numeral 26 and extends downwardly through the tube 17, cap 14 and into the cylinder 12, where it passes downwardly through the centralizing disk 27 and terminates in the chuck or tool socket 28. A collar 29 on the lower portion of the bar 26 supports the centralizing disk 27, the latter having a plurality of peripheral rollers 30 thereon.

The upper portion of the bar 26 extends through an opening in the platform 31 and a collar 32 is attached to the bar just below the platform 31 and upon this collar rests the yoke 33 from which depends the arms 34—34, these arms being pivotally connected as at 35 to the free running ring 36 carried by the ratchet assembly 18.

Mounted upon the platform 31 is the pair of right and left ratchet units generally referred to by numeral 37 and 38 which are constructed substantially in the same manner as the hand ratchet unit generally referred to by numeral 18. These ratchet assemblies 37 and 38 operate shafts carrying beveled gears 39 and 40 which mesh with the beveled gear 41 on the upper end of the boring bar 26.

The cylinder 12 carries a pair of laterally disposed arms 42—42 each having an opening 43 in the outer end portion thereof for receiving the lower ends of the pins 44 which depend from the platform 31. These pins and arms when interconnected obviously prevent rotation of the platform 31.

Numeral 45 represents the usual hand wheel for controlling the flop valve which is of conventional construction and numeral 46 represents a by-pass for the interior of the body.

Steadying jacks in the form of plates 47—47 each having an upstanding threaded body 48 are employed and these are threadedly disposed through the arms 49 carried by the clamp 50 which embraces the cylinder 12.

Obviously by actuating the units 37 and 38 the boring bar 26 can be actuated and obviously by regulating the ratchet unit 18, the speed of the boring bar can be taken care with precision.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A pipe tapping apparatus comprising a pipe attachable body, a drill bar extending downwardly through the body and having a tool attachable means at the inner end thereof, a shell mounted on the body and having a threaded tubular extension through which the drill bar is feedable, a platform, said drill bar extending upwardly through the platform and provided with a gear at its upper end above the platform, a pair of shafts mounted on the platform each provided with a beveled gear meshing with the first-mentioned gear, manual means for operating the said second-mentioned beveled gears, a nut feedable on the threaded tubular extension, ratchet means for feeding the nut, a collar on the drill bar, a yoke engaging the collar and being connected to the nut and guide means between the platform and the shell.

2. A pipe tapping apparatus comprising a pipe attachable body, a drill bar extending downwardly through the body and having a tool attachable means at the inner end thereof, a shell mounted on the body and having a threaded tubular extension through which the drill bar is feedable, a platform, said drill bar extending upwardly through the platform and provided with a gear at its upper end above the platform, a pair of shafts mounted on the platform each provided with a beveled gear meshing with the first-mentioned gear, manual means for operating the said second-mentioned beveled gears, a nut feedable on the threaded tubular extension, ratchet means for feeding the nut, a collar on the drill bar, a yoke engaging the collar and being connected to the nut and guide means between the platform and the shell, said guide means comprising a pin depending from the platform, an adjustable clamp on the shell provided with a laterally disposed arm having an opening therein, said pin being slidably disposed in the opening of the arm.

3. A pipe tapping apparatus comprising a pipe attachable body, a drill bar extending downwardly through the body and having a tool attachable means at the inner end thereof, a shell mounted on the body and having a threaded tubular extension through which the drill bar is feedable, a platform, said drill bar extending upwardly through the platform and provided with a gear at its upper end above the platform, a pair of shafts mounted on the platform each provided with a beveled gear meshing with the first mentioned gear, manual means for operating the said second mentioned beveled gear, a nut feedable on the threaded tubular extension, ratchet means for feeding the nut, a collar on the drill bar, a yoke engaging the collar and being connected to the nut, a clamp structure on the shell, and pins depending from the platform, said clamp structure having openings therein through which the pins are slidably disposed.

GEORGE MARANGELO.